(12) United States Patent
Lewtas et al.

(10) Patent No.: US 6,646,067 B2
(45) Date of Patent: Nov. 11, 2003

(54) PETROLEUM RESINS AND THEIR PRODUCTION WITH BF₃ CATALYST

(75) Inventors: Kenneth Lewtas, Tervuren (BE); Maria Leonor Garcia, Brussels (BE); James Hanley Clark, York (GB); Karen Wilson, Southbank (GB)

(73) Assignee: ExxonMobil Chemical Patents Inc., Houston, TX (US)

( * ) Notice: Subject to any disclaimer, the term of this patent is extended or adjusted under 35 U.S.C. 154(b) by 2 days.

(21) Appl. No.: 10/006,764

(22) Filed: Dec. 6, 2001

(65) Prior Publication Data

US 2002/0086954 A1 Jul. 4, 2002

Related U.S. Application Data

(62) Division of application No. 09/619,419, filed on Jul. 19, 2000, now Pat. No. 6,479,598.
(60) Provisional application No. 60/153,666, filed on Sep. 14, 1999.

(30) Foreign Application Priority Data

Jul. 19, 1999 (GB) ............................................. 9916855

(51) Int. Cl.⁷ .................................................. C08F 4/00
(52) U.S. Cl. ......................... 526/89; 526/237; 526/290; 156/295
(58) Field of Search .......................... 526/89, 290, 237; 156/295

(56) References Cited

U.S. PATENT DOCUMENTS

| | | | |
|---|---|---|---|
| 4,328,090 A | 5/1982 | Stuckey, Jr. et al. | 208/44 |
| 4,629,766 A | 12/1986 | Malatesta et al. | 525/222 |
| 5,017,714 A | 5/1991 | Welborn, Jr. | 556/12 |
| 5,055,438 A | 10/1991 | Canich | 502/117 |
| 5,096,867 A | 3/1992 | Canich | 502/103 |
| 5,153,157 A | 10/1992 | Hlatky et al. | 502/117 |
| 5,171,793 A | 12/1992 | Johnson et al. | 525/332.1 |
| 5,198,401 A | 3/1993 | Turner et al. | 502/155 |
| 5,240,894 A | 8/1993 | Burkhardt et al. | 502/108 |
| 5,264,405 A | 11/1993 | Canich | 502/103 |
| 5,324,800 A | 6/1994 | Welborn, Jr. et al. | 526/160 |
| 5,451,704 A * | 9/1995 | Ho et al. | 585/512 |
| 5,502,104 A | 3/1996 | Hohner et al. | 524/556 |
| 5,507,475 A | 4/1996 | Seel et al. | 267/64.12 |

FOREIGN PATENT DOCUMENTS

| | | |
|---|---|---|
| CA | 1268753 | 5/1990 |
| EP | 0 082 726 B | 4/1986 |
| EP | 0 277 003 A | 8/1988 |
| EP | 0 277 004 A | 8/1988 |
| EP | 0 129 368 B | 7/1989 |
| EP | 0 426 637 B | 4/1995 |
| EP | 0 520 732 B | 12/1995 |
| EP | 0 570 982 B | 1/1997 |
| EP | 0 495 375 B | 2/1997 |
| EP | 0 500 944 B | 10/1998 |
| EP | 0 573 403 B | 11/1998 |
| WO | WO 91/09882 | 7/1991 |
| WO | WO 92/00333 | 1/1992 |
| WO | WO 93/03093 | 2/1993 |
| WO | WO 94/03506 | 2/1994 |
| WO | WO 94/26816 | 11/1994 |
| WO | WO 95/12623 | 5/1995 |
| WO | WO 95/26818 | 10/1995 |
| WO | WO 98/22214 | 5/1998 |
| WO | WO 98/30587 | 7/1998 |
| WO | WO 00/13792 | 3/2000 |

OTHER PUBLICATIONS

Peter T. Tanev and Thomas J. Pinnavaia, "*A Neutral Templating Route to Mesoporous Molecular Sieves*" Science, v.267, Feb. 10, 1995, pp. 865–867.

Karen Wilson and James H. Clark, "*Synthesis of a Supported Solid Acid BF₃ Catalyst*", J. of Chem. Soc., Chem. Commun. (1998), pp. 2135–2136.

C.T. Kresge, et al., "*Ordered Mesoporous Molecular Sieves Synthesized by a Liquid–Crystal Template Mechanism*", Nature, v.359(6397), Oct. 22, 1992, pp. 710–712.

* cited by examiner

Primary Examiner—David W. Wu
Assistant Examiner—William Cheung

(57) ABSTRACT

Petroleum resins are produced using a supported BF₃ cocatalyst complex. Preferably the cocatalyst is organic such as an alcohol or a carboxylic acid. Use of the catalyst in supported form together with the cocatalyst enables control over both Bronsted and Lewis acidity leading to better control of resin properties. Waste disposal and catalyst handling problems are also overcome.

18 Claims, No Drawings

PETROLEUM RESINS AND THEIR PRODUCTION WITH BF₃ CATALYST

This application is a Divisional of U.S. application Ser. No. 09/619,419 (Filed Jul. 19, 2000) now U.S. Pat No. 6,479,598. Ser. No. 09/619,419 claims the benefit of U.S. application Ser. No. 60/153,666 (Filed Sep. 14, 1999).

The present invention is concerned with the production of petroleum resins and with the improved resins so produced.

Petroleum resins are well known and are produced by the Friedel-Crafts polymerization of various feeds, which may be pure monomer feeds or refinery streams containing mixtures of various unsaturated materials. Typical feeds are $C_4$ to $C_6$ or $C_8$ to $C_9$ olefin and diolefin feeds and mixtures thereof and a variety of pure olefinic monomers.

The resulting hydrocarbon resins can range from viscous liquids to hard, brittle solids with colours ranging from water white to pale yellow, amber, or dark brown depending on the monomers used and the specific reaction conditions. Typically, pure monomer resins tend to be water white, $C_9$ monomer resins tend to be brown, and $C_5$ monomer resins tend to be yellow.

Hydrocarbon resins are used in adhesives, rubbers, hot-melt coatings, printing inks, paint, flooring, road marking and polymer and other applications. The resins are usually used to modify other materials.

Pure monomer hydrocarbon resins can be prepared by cationic polymerization of styrene-based monomers such as styrene, alpha-methyl styrene, vinyl toluene, and other alkyl substituted styrenes using Friedel-Crafts polymerization catalysts such as unsupported Lewis acids (e.g., boron trifluoride ($BF_3$), complexes of boron trifluoride, aluminium trichloride ($AlCl_3$), alkyl aluminium chlorides).

Similarly, aliphatic $C_4$ to $C_6$ hydrocarbon resins can be prepared by cationic polymerization of cracked petroleum distillates containing $C_4$, $C_5$ and $C_6$ paraffins, olefins, and diolefins also referred to as "$C_5$ monomers". These monomer streams are comprised of cationically polymerizable monomers such as 1,3-pentadiene which is the primary reactive component, along with butadiene, cyclopentene, pentene, 2-methyl-2-butene, 2-methyl-2-pentene, isoprene, cyclopentadiene, and dicyclopentadiene. The polymerizations are catalysed using Friedel-Crafts polymerization catalysts such as unsupported Lewis acids (e.g., boron trifluoride ($BF_3$), complexes of boron trifluoride, aluminium trichloride ($AlCl_3$), or alkyl aluminium chlorides). In addition to the reactive components, non-polymerizable components in the feed include saturated hydrocarbons, which can be co-distilled with the unsaturated components such as pentane, cyclopentane, or 2-methyl pentane. This monomer feed can be co-polymerized with $C_4$ or $C_5$ olefins or dimers.

Aromatic $C_9$ hydrocarbon resins can be prepared by cationic polymerization of aromatic $C_8$, $C_9$, and/or $C_{10}$ unsaturated monomers derived from petroleum distillates resulting from naphtha cracking and are referred to as "$C_9$ monomers". These monomer streams are typically comprised of mixtures of cationically polymerizable monomers such as styrene, alpha methyl styrene, beta methyl styrene, vinyl toluene, indene, dicyclopentadiene, divinylbenzene, and other alkyl substituted derivatives of these components. In addition to the reactive components, non-polymerizable components include aromatic hydrocarbons such as xylene, ethyl benzene, cumene, ethyl toluene, indane, methylindene, naphthalene and other similar species.

Although unsupported Lewis acids are effective catalysts for cationic polymerization reactions to produce hydrocarbon resins, they have several disadvantages. Conventional unsupported Lewis acids are single use catalysts, which require processing steps to quench the reactions and neutralise the acids. Further, conventional unsupported Lewis acids also require removal of catalyst salt residues from the resulting resin products. Once the salt residues generated from the catalyst neutralisation are removed, the disposal of these residues presents an environmental hazard and additional cost. Therefore, it is of particular interest to reduce the amount of catalyst residues, particularly halogen-containing species generated in these reactions.

Another problem involved in using conventional unsupported Lewis acid catalysts, such as $AlCl_3$ and $BF_3$, is that they are hazardous materials. These conventional Lewis acid catalysts generate highly corrosive acid gases on exposure to moisture, (e.g., HF, HCl) and it has been necessary to rigorously dry the feeds prior to polymerization.

The present invention therefore seeks to overcome these problems and to provide a commercially viable process for the production of petroleum resins, particularly from $C_5$ to $C_6$ or $C_8$ to $C_9$ refinery feedstreams or mixtures thereof which can tolerate conventional impurities in the feed, reduces catalyst residues in the resin and does not require extensive spent catalyst disposal.

The invention employs a supported Friedel-Crafts catalyst. It has been suggested in PCT publication WO95/26818 that supported Lewis acid catalysts may be used for hydrocarbon conversion reactions including the polymerization of unsaturated monomers such as piperylene. More recently, PCT publication WO98/130587 is specifically concerned with supported metal halide catalysts useful for the preparation of hydrocarbon resins, WO 98/130587 is primarily concerned with using zinc, zirconium and aluminium halide catalysts.

We have found, however, that particular supported boron trifluoride catalysts when used with particular feeds give new resins with desirable and improved properties.

Conventionally when using boron trifluoride catalysts in complexed or uncomplexed form, it has been necessary to rigorously dry the reaction feeds. We have found that when using a particular type of boron trifluoride catalyst moisture in the feed can be tolerated and can, in some instances, be beneficial.

Accordingly we have found that by using a supported boron trifluoride catalyst, which is complexed with an organic or inorganic cocatalyst, the catalyst properties can be controlled and the catalyst can be used to produce petroleum resins in high yield including certain novel petroleum resins having particularly desirable properties. The use of the boron trifluoride complex enables better control of the acid strength of the catalyst and allows catalysts of increased strength to be used. In particular we find that when petroleum resins produced in this way are used in adhesive formulations for bonding substrates to metal adhesive compositions that are highly resistant to high shear conditions may be obtained. We have also found that when used with natural rubber an adhesive with good cohesion may be obtained with a resin of lower molecular weight as compared with resins produced using other conventional catalyst systems.

The present invention therefore provides a process for the production of petroleum resins by the polymerization of $C_5$ to $C_6$ and/or $C_8$ to $C_9$ unsaturated hydrocarbon feeds wherein the feed is contacted under polymerization conditions with a supported boron trifluoride cocatalyst complex.

The preferred supported boron trifluoride catalysts are described in Chemical Communications 1998, Pages 2135 and 2136 and are the subject of PCT Patent Publication WO 00/13792.

This preferred catalyst is a novel form of a supported boron trifluoride complex that exhibits Bronsted and Lewis acid properties that can be tuned by varying the cocatalyst, the nature of the support and the calcination temperature. The catalytic activity of homogeneous boron trifluoride complexes in many organic reactions is dependent on the ability of the complex $[H^+][X:BF_3^-]$ where X is the complexing agent, to act as a proton donor to olefins. The activity of the cocatalyst (HX) in homogenous systems is observed to decrease in the order.

$HF > H_2SO_4 > H_3PO_4 > C_6H_5OH > H_2O > RCOOH > ROH$

Silica is a preferred catalyst support. We have now found that by supporting different polarizable proton donating boron trifluoride complexes on $SiO_2$, tuneable catalytic activity combined with the advantage of ease of catalyst recovery of a heterogeneous solid acid can be achieved. Subsequent thermal treatment of the catalyst also enables additional tuning of the relative amounts of Lewis and Bronsted acid sites present, as exemplified below:

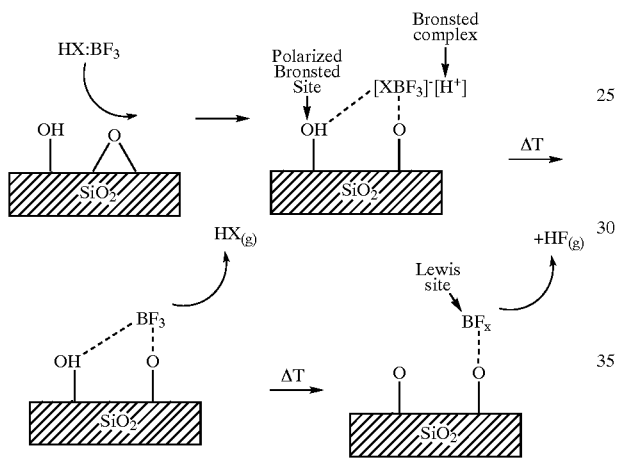

where HX is the complexing ligand. Bronsted acidity in solid acid catalysts normally arises from polarised δsites. The observation of strong Bronsted acidity following attachment of a Lewis acid centre to a support, such as a support having free surface oxide or hydroxyl groups, has been attributed to polarisation of surface hydroxyl groups via an inductive effect of the electronegative halogen atoms of the Lewis acid on the acid site. In our preferred system additional Bronsted acidity is obtained from the Bronsted complex illustrated above.

By varying the complexing ligand HX and the nature of the support, the Bronsted complex acidity can be varied. We prefer that the pKa of the complexing ligand be between 2.0 and 4.5, ethanol and acetic acid are particularly beneficial complexing agents. If the complexing ligand is too acidic the system is destabilised, if too basic the catalytic activity is reduced. The choice of solvent (which can also complex with the $BF_3$) used during the preparation of the complex will alter the acidic properties of the catalyst. Protic solvents (alcohols) will result in enhanced Bronsted acidity compared to nonprotic solvents (ethers, aromatic hydrocarbons). The solvent used in the preparation is preferably predried to avoid hydrolysis of the $BF_3$ complex. Characterization of these solid acids by MAS-NMR, DRIFTS and pyridine titration enable the Bronsted or Lewis acid characteristics of the different catalysts to be determined. We also expect that the thermal stability of these supported catalyst complexes will vary depending on the precursor used. Thus the relative amount of Bronsted: Lewis acid sites can be tuned by precalcining the support under an inert atmosphere.

This has been demonstrated by the following four different catalyst systems showing the effect of cocatalyst and solvent on the Bronsted acidity of the resulting solid acid catalyst.

a) $BF_3$ $(H_2O)_2$ (4.1 g, 0.04 mol) was added to a slurry of 100 ml of absolute ethanol and 10 g of K100 $SiO_2$ that had been dried at 300° C. for 24 hours. The mixture was stirred for 2 hours at room temperature under a $N_2$ flow of 50 ml min$^{-1}$. The slurry was then transferred to a rotary evaporator and dried at 50° C. for a period of 4 hours to remove all the ethanol.

b) $BF_3(H_2O)_2$ (4.1 g, 0.04 mol) was added to a slurry of 100 ml anhydrous toluene and 10 g of K100 $SiO_2$ that had been dried at 300° C. for 24 hours. The mixture was stirred for 2 hours at 25° C. under a $N_2$ flow of 50 ml min$^{-1}$. The slurry was then transferred to a rotary evaporator and dried at 50° C. for a period of 4 hours to remove all the toluene.

c) $BF_3(OEt_2)$ (5.6 g, 0.04 mol) was added to a slurry of 100 ml toluene and 10 g of K100 $SiO_2$ that had been dried at 300° C. for 24 hours. The mixture was stirred for 2 hours under reflux under a $N_2$ flow of 50 ml min$^{-1}$. The slurry was then transferred to a rotary evaporator and dried at 50° C. for a period of 4 hours to remove all the toluene.

d) $BF_3(OEt_2)$ (5.6 g, 0.04 mol) was added to a slurry of 100 ml absolute ethanol and 10 g of K100 $SiO_2$ that had been dried at 300° C. for 24 hours. The mixture was stirred for 2 hours at room temperature under a $N_2$ flow of 50 ml min$^{-1}$. The slurry was then transferred to a rotary evaporator and dried at 50° C. for a period of 4 hours to remove all the ethanol.

Characterization of the Catalysts a) Characterization of the supported $BF_3/SiO_2$ catalysts was performed using DRIFTS in conjunction with pyridine titration, which show that all the catalysts exhibit both Lewis and Bronsted acidity. This is determined by the absorption bands observed in DRIFTS spectra at 1445 and 1461 cm$^{-1}$, (Lewis sites), 1638 and 1539 cm$^{-1}$ (Bronsted sites) and 1611 and 1489 cm$^{-1}$ (combined Lewis/Bronsted sites). There is a striking difference in the nature of the acid sites depending on catalyst preparation, with the catalysts prepared in ethanol exhibiting higher concentrations of Bronsted acid sites that those prepared in toluene.

b) The origin of the acid sites on the ethanol prepared catalysts was investigated using thermogravimetric analysis coupled with evolved gas FTIR (TGIR), which allows molecules desorbing from the catalyst during thermal analysis to be identified by their vibrational spectrum. Heating both catalysts above 100° C. results in significant weight loss and the observation of ethanol desorption in the IR. However the differential mass lost indicates that the ethanol desorption temperature from $BF_3(H_2O)_2/SiO_2$ is 10° C. higher than from $BF_3.OEt_2/SiO_2$, and approximately twice the amount of ethanol is evolved. The uptake of short chain alcohols can be used as an indication of the strength and concentration of Bronsted acid sites. These results therefore suggest that $BF_3(H_2O)_2/SiO_2$ possesses a higher coverage of stronger Bronsted acid sites compared to $BF_3.OEt_2/SiO_2$. Further heating beyond 400° C. results in an additional weight loss which is accompanied by the evolution of HF from the catalyst.

c) Corresponding DRIFTS/pyridine titrations of catalysts calcined to 200 and 400° C. under $N_2$, indicate that the Bronsted sites are gradually lost as the calcination temperature is increased. The most dramatic decrease in Bronsted acidity occurs once ethanol desorption is complete.

The evolution of ethanol above 100° C. coupled with the loss of Bronsted acidity indicates that Bronsted acid sites in the $BF_3(H_2O)_2/SiO_2$ catalyst may arise from the binding of ethanol to supported $BF_3$ centres resulting in the formation of a $[SiOBF_3]^-[EtOH_2]^+$ complex. Further evidence in support of this model comes from $^1H$ MAS NMR of the as prepared catalyst which shows resonances at 1.34, 4.01 and 8.16 ppm which are consistent with $CH_3$, $CH_2$ and $OH_2^+$ of protonated ethanol respectively. Previous studies have reported that ligand exchange between $BF_3.OEt_2$ and ethanol results in the formation of $H^+[BF_3OEt]^-$ complexes. However, to form the protonated ethanol complex proposed in this model interaction with a more protic $BF_3$ complex is required e.g. $BF_3(H_2O)_2$, which can exist as $[H_3O]^+[BF_3OH]^-$. The trend in Bronsted acidity observed between $BF_3.OEt_2$ and $BF_3(H_2O)_2$ precursors can thus be explained. Desorption of ethanol from the $BF_3(H_2O)_2/SiO_2$ catalyst following 200° C. calcination lowers the number of Bronsted sites titratable by pyridine. We attribute those remaining to the polarisation of surface hydroxyl groups on the support by the $BF_x$ centres. 400° C. dehydroxylation of the support further reduces the number of Bronsted sites leaving predominately Lewis acid character which is attributed to the remaining $BF_x$ sites. The evolution of HF above 400° C. observed by TGIR indicates that these $BF_x$ groups start to decompose above this temperature, and by 600° C. no titratable acid sites remain indicating complete decomposition of the $BF_x$ centres.

Accordingly the ability to balance the nature of the support, source of $BF_3$, nature of the cocatalyst and method of catalyst production enables great versatility in catalyst nature and performance. This is reflected in the properties of the resins produced when using the catalyst systems according to this invention.

Thus whilst the present invention provides an improved process to produce conventional resins in a second aspect the invention provides novel petroleum resins. In particular when the invention is performed using a mixed aliphatic/aromatic feed it enables, for a particular feed, the incorporation of higher amounts of aromatic materials into the products produced than when using other catalysts. For example we have been able to produce resins from such mixed feeds having softening points above 80° C. containing greater than 35% aromatics (as measured by NMR as equivalents of styrene). Use of the catalyst system according to the present invention enables the production of aromatic containing resins of any desired aromatic content up to 100% aromatics. It is believed this may be reflected in the improved adhesive properties obtained when using the resin as a tackifier.

As a further aspect the petroleum resins produced according to the present invention are used as tackifiers in adhesive systems such as solvent based adhesives, hot melt adhesives and pressure sensitive adhesives. In such adhesive systems the petroleum resin acts as a tackifier for other polymers and rubbers used in the adhesive system. The choice of the polymer and/or the rubber depends on the nature of the adhesive and its particular application. For example hot melt adhesives frequently are based on ethylene containing copolymers, particularly ethylene/vinyl acetate copolymers. Pressure sensitive adhesives frequently are based on natural or synthetic rubbers such as styrene butadiene copolymer rubbers, solvent based adhesives may be aqueous emulsions or organic solvent based, although for environmental reasons aqueous systems are preferred. Examples of polymer systems useful in such aqueous adhesive systems are polyacrylate and polymethacrylate emulsions. We have found that the resins of this invention have particularly good shear stability when used in pressure sensitive adhesives, particularly shear on metal and cardboard.

The polymerization conditions are standard conditions for the production of petroleum resins and should be chosen according to the nature of the feed to be polymerized and the ultimate properties required of the resin.

The choice of the support for the catalyst, the method of catalyst manufacture and choice of cocatalyst will also depend upon the feed to be polymerized and the resin properties desired. The cocatalyst may be organic or inorganic compounds such as alcohols, carboxylic (preferably acetic) acids, phosphoric acid or water. The ability to choose both the support and the cocatalyst adds flexibility in that by varying the nature of the support, the method of preparation, and the cocatalyst, the ratio of Lewis acidity to Bronsted acidity can be varied producing catalysts suitable for the production of resins with particular desired properties.

We have found that these supported $BF_3$ cocatalyst complexes are effective for the production of petroleum resins of high quality without the need for traditional catalyst residue removal. Whilst the catalysts can be used in the polymerization of $C_4$ to $C_6$ and/or $C_8$ to $C_9$ feeds they are particularly useful in the polymerization of feeds containing unsaturated aromatic monomers. The monomers may be pure monomers such as alpha-methyl styrene and vinyl toluene or petroleum feeds containing mixtures of the unsaturated aromatic materials. The use of the supported $BF_3$/cocatalyst systems according to the present invention enables greater flexibility when polymerising feeds containing monomers that polymerize at different rates such as mixtures of olefins and diolefins. We have found that the invention can enable 100% conversion of mixed $C_9$ feeds to aromatic petroleum resins. The unsaturated aromatic monomers may be copolymerized with other unsaturated materials, particularly $C_4$ to $C_6$ unsaturated materials, which may be petroleum feeds which are mixtures of such materials or pure $C_5$ monomers. The composition of the feed will be selected according to the use to which the resin is to be put. We have also found that these catalysts are effective without extensively drying the feeds as has been necessary in the past.

Before use, the solid acid catalysts and/or supports may be treated to remove freely associated water associated with the solids to maximise catalyst acidity and activity. For example, prior to use, the catalyst and/or support may be calcined for a sufficient time to remove freely associated water and/or the catalyst and/or support can be exposed to reduced atmospheric pressure. For instance, the calcining may be at a temperature up to 700° C., preferably at a temperature between 50° C. and 500° C. The calcining may be under reduced atmospheric pressure for up to 8 hours, preferably between 1 hour to 4 hours.

The nature of the support is also important. It must be able to react with the $BF_3$ and can be chosen according to the nature of the feed, the cocatalyst and the desired resin properties. Examples of suitable supports are materials containing surface hydroxyl groups such as silica, synthetic silicas (MCM), hexagonal mesoporous silica (HMS) as described in Nature 1992 359, Page 710 and Science 267

Page 865, and clay supports, including naturally occurring clay mineral such as at least one member selected from the group consisting of kaolinite, bentonite, attapulgite, montmorillonite, clarit, Fuller's earth, hectorite, and beidellite; synthetic clay such as at least one member selected from the group consisting of saponite and hydrotalcite; montmorillonite clay treated with at least one member selected from the group consisting of sulphuric acid and hydrochloric acid; and modified clay including at least one member selected from the group consisting of aluminium oxide pillared clay, cerium modified alumina pillared clay, and metal oxide pillared clay. The preferred supports have surface hydroxyl groups which can react with the boron trifluoride. Mesoporous silica is a particularly preferred support.

The support may also include at least one member selected from the group consisting of zeolite β, zeolite Y, zeolite X, MFI, MEL, NaX, NaY, faujasite, mordenite, alumina, zirconia, titania and alumino silicates.

The support may also be calcined and we have found that when using a silica support calcination alters the nature of the surface hydroxyl groups on the silica. The calcination produces isolated as opposed to vicinal hydroxyl groups, which leads to a different interaction with the boron trifluoride which in turn leads to a different polymerization reaction. Calcination has been found to improve resin yield and decrease the formation of low molecular by-product known as fill.

The pore size of the support should be such that the monomer has access to the catalytic species. Furthermore, the pore size should be such that it is not readily clogged with the polymeric resin once formed. We have found that in order to obtain satisfactory resin yields the pore size should be at least 100 Å. By "pore size" we mean the narrowest cross-section of the pore. This may be the diameter of the orifice or the neck of the pore, which in some instances is narrower than the orifice.

The amount of catalyst that is loaded onto the support also has a significant effect on the properties of the resin obtained. We have found that yield increases with increased catalyst loading with good control of resin molecular weight up to a certain loading level. The optimum level depends upon the nature of the boron trifluoride/cocatalyst complex and the nature of the support however above this particular level the control of molecular weight is lost and resins of too high molecular weight are produced. By way of example when using a boron trifluoride/ethanol complex catalyst supported on K 100 silica yield increases as the catalyst loading increases to about 4 mmole $BF_3$/g but at higher loadings this high molecular weight materials are produced. This is believed to be because at these higher loadings there is unsupported catalyst present and the system operates, at least to some extent, as a homogeneous system.

The feedstream may include between 20 wt % and 80 wt % monomers and 80 wt % to 20 wt % of solvent. Preferably, the feedstream includes 30 wt % to 70 wt % monomers and 70 wt % to 30 wt % of solvent. More preferably, the feedstream includes about 50 wt % to 70 wt % monomers and 50 wt % to 30 wt % of solvent. The solvent may include an aromatic solvent. The aromatic solvent may include at least one member selected from the group consisting of toluene, xylenes, and aromatic petroleum solvents. The solvent may include an aliphatic solvent. The solvent may be the unpolymerizable component in the feed. The invention may further include recycling the solvent.

In one aspect, the feedstream includes at least $C_5$ monomers. If desired cyclopentadiene and methylcyclopentadiene components may be removed from the feedstream by heating at a temperature between 100° C. and 160° C. and fractionating by distillation. The $C_5$ monomers may include at least one member selected from the group consisting of butadiene, isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene. The feedstream may include at least $C_5$ monomers. A preferred feedstream includes at least 70 wt % of polymerizable monomers with at least about 50 wt % 1,3-pentadiene. The feedstream may contain low levels of isoprene. It generally contains a portion of 2-methyl-2-butene, and may contain one or more cyclodiolefins.

The feedstream may further include up to 40 wt % of a chain transfer agent, preferably up to 20 wt % of chain transfer agent. The chain transfer agent may include at least one member selected from the group consisting of $C_4$ olefins, $C_5$ olefins, dimers of $C_4$ olefins, and dimers of $C_5$ olefins. The chain transfer agent may include at least one member selected from the group consisting of isobutylene, 2-methyl-1-butene, 2-methyl-2-butene, dimers thereof, and oligomers thereof.

In accordance with another aspect, the feedstream includes 30 wt % to 95 wt % of $C_5$ monomers and 70 wt % to 5 wt % of a co-feed including at least one member selected from the group consisting of pure monomer, $C_9$ monomers, and terpenes. Preferably, the feedstream includes 50 wt % to 85 wt % of $C_5$ monomers and 50 wt % to 15 wt % of a co-feed including at least one member selected from the group consisting of pure monomer, $C_9$ monomers, and terpenes.

In a further aspect, the feedstream includes at least $C_9$ monomers. The $C_9$ monomers may include at least one member selected from the group consisting of styrene, vinyl toluene, indene, dicyclopentadiene, and alkylated derivatives thereof. The $C_9$ monomers may include at least 20 wt % polymerizable unsaturated hydrocarbons. The $C_9$ monomers may include 30 wt % to 75 wt % polymerizable unsaturated hydrocarbons, typically 35 wt % to 70 wt % polymerizable unsaturated hydrocarbons.

Pure monomer feedstreams may contain relatively pure styrene-based monomers such as styrene, alpha-methyl styrene, beta-methyl styrene, 4-methyl styrene, and vinyl toluene fractions. The monomers can be used as pure components or as blends of two or more monomer feeds to give desired resin properties. Preferred blends include 20 wt % to 90 wt % alpha-methyl styrene with 80 wt % to 10 wt % of one or more co-monomers, preferably styrene, vinyl toluene, 4-methyl styrene or blends of these components. In addition, other alkylated styrenes can be used as monomers in this invention such as t-butyl styrene or phenyl styrene.

In yet another aspect, the feedstream includes 30 wt % to 95 wt % of the $C_9$ monomers and 70 wt % to 5 wt % of a co-feed including at least one member selected from the group consisting of pure monomer, $C_5$ monomers, and terpenes. Preferably, the feedstream includes 50 wt % to 85 wt % of the $C_9$ monomers and 50 wt % to 15 wt % of a co-feed including at least one member selected from the group consisting of pure monomer, $C_5$ monomers, and terpenes.

In accordance with yet another feature of the invention, the catalyst is added to the feedstream.

In accordance with another feature of the invention, the feedstream is added to a slurry of the catalyst in a solvent. The feedstream may be passed over a fixed bed of the catalyst.

In accordance with yet another feature of the invention, the feedstream is co-fed with a slurry of the catalyst into a reactor.

The polymerization is carried out as a continuous process or as a batch process. The reaction time in the batch process is 30 minutes to 8 hours, preferably 1 hour to 4 hours at reaction temperature and at a reaction temperature between −50° C. and 150° C., preferably between −20° C. and 100° C., and more preferably between 0° C. and 70° C. The polymerization may be stopped by removing the catalyst from the hydrocarbon resin. The catalyst may be removed from the hydrocarbon resin by filtration. The hydrocarbon resin may be removed from a fixed bed reactor which includes the catalyst and may be stripped to remove unreacted monomers, solvents, and low molecular weight oligomers. The unreacted monomers, solvents, and low molecular weight oligomers may be recycled.

The feedstream may be chosen according to the desired properties of the hydrocarbon resin. For example the feedstream may include at least $C_5$ monomers, wherein the softening point of the resulting hydrocarbon resin is between 50° C. and 150° C. Alternatively, the feedstream may include at least $C_9$ monomers, wherein the softening point of the resulting hydrocarbon resin is between about 70° C. and 160° C.

In accordance with preferred feature of the invention, the feedstream includes at least pure monomer, wherein the resulting hydrocarbon resin has a number average molecular weight (Mn) ranging from 400 to 2000, a weight average molecular weight (Mw) ranging from 500 to 5000, a Z average molecular weight (Mz) ranging from 500 to 10,000, and a polydispersity (PD) as measured by Mw/Mn between about 1.5 and 3.5, where Mn, Mw, and Mz are determined by size exclusion chromatography (SEC).

In accordance with another feature of the invention, the feedstream includes at least $C_5$ monomers, wherein the resulting hydrocarbon resin has a number average molecular weight (Mn) of 400 to 2000, a weight average molecular weight (Mw) of 500 to 3500, a Z average molecular weight (Mz) of 700 to 15,000 and a polydispersity (PD) as measured by Mw/Mn between about 1.5 and 4, where Mn, Mw, and Mz are determined by size exclusion chromatography (SEC).

In accordance with yet another feature of the invention, the feedstream includes at least $C_9$ monomers, wherein the resulting hydrocarbon resin has a number average molecular weight (Mn) of 400 to 1200, a weight average molecular weight (Mw) of 500 to 2000, a Z average molecular weight (Mz) of 700 to 6000, and polydispersity (PD) as measured by Mw/Mn between 1.5 and 3.5, preferably 1.5 and 2.5, where Mn, Mw, and Mz are determined by size exclusion chromatography (SEC).

The supported boron trifluoride cocatalyst complex may involve any combination of a single type or plurality of types of $BF_3$ on a single type or plurality of types of supports and may be complexed with one or more reagents. It is preferred that the $BF_3$ be complexed with water or an organic compound, particularly alcohols such as methanol, ethanol and propanol or carboxylic acids such as acetic, propionic or butyric acid.

It is expected that by controlling the conditions under which the catalyst is calcined, such as controlling the temperature or time under which the calcination step takes place, tailoring of the physical properties of the resultant resin, such as its softening point or its molecular weight, may be achieved.

Unlike Friedel-Crafts catalysts previously proposed for the production of hydrocarbon resins the supported $BF_3$ cocatalyst complex used in the present invention are most effective in the presence of a small amount of water in the feedstream. Accordingly, they may be used without the need for costly, rigorous drying of the feed.

Also concerning $C_5$ monomer feedstreams, in addition to the reactive components, non-polymerizable components in the feed may include saturated hydrocarbons which can be co-distilled with the unsaturated components such as pentane, cyclopentane, or 2-methyl pentane. This monomer feed can be co-polymerized with $C_4$ or $C_5$ olefins or dimers as chain transfer agents. Chain transfer agents may be added to obtain resins with lower molecular weight and narrower molecular weight distributions than can be prepared from using the $C_5$ monomers alone. Chain transfer agents stop the propagation of a growing polymer chain by terminating the chain in a way which regenerates a polymer initiation site. Components which behave as chain transfer agents in these reactions include but are not limited to isobutylene, 2-methyl-1-butene, 2-methyl-2-butene or dimers or oligomers of these species. The chain transfer agent can he added to the reaction in pure form or diluted in a solvent.

The preferred solvents for the polymerization are aromatic solvents. Typically toluene, xylenes, or light aromatic petroleum solvents. These solvents can be used fresh or recycled from the process. The solvents generally contain less than 200 ppm water, preferably less than 100 ppm water, and most preferably less than 50 ppm water. The preferred solvents are aromatic solvents. Generally, unreacted resin oil components are recycled through the process as solvent. In addition to the recycled solvents, toluene, xylenes, or aromatic petroleum solvents can be used. These solvents can be used fresh or recycled from the process. The solvents generally contain less than 500 ppm water, preferably less than 200 ppm water, and most preferably less than 50 ppm water. The solvent may also be the non-polymerizable component of the feed.

Concerning the polymerization reaction conditions, a first important variable is the amount of catalyst which is used. It is preferably used at a level of 0.1 wt % to 30 wt % based on the weight of the monomer. For pure monomer resins, the concentration is preferably 0.1 to 15 wt %, more preferably 0.5 wt % to 10 wt %, and most preferably 0.5 wt % to 8 wt %. For $C_5$ monomers, the concentration is preferably 0.5 wt % to 30 wt %, more preferably 1 wt % to 20 wt %, and most preferably 3 wt % to 15 wt %. For $C_9$ monomers, the concentration is preferably 0.5 wt % to 30 wt %, more preferably 1 wt % to 20 wt %, and most preferably 3 wt % to 15 wt %.

A second important variable in the reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the catalyst in a solvent. For a set catalyst level and reaction temperature, substantially lower softening point resins are obtained when the monomer is added to a catalyst slurry. Lower molecular weights and narrow polydispersity (PD), i.e., Mw/Mn, as measured by size exclusion chromatography, are obtained when the monomer is added to the catalyst slurry compared with resins where the catalyst is added to the monomer.

The use of the catalyst system in this invention enables much greater control over the catalyst acidity through the ability to vary the nature of the support and the nature and amount of the cocatalyst. This in turn enables better control of resin properties particularly molecular weight and polydispersity, narrow polydispersity is important to ensure compatibility of resin with polymers in end use applications.

A third important variable is the reaction temperature. Polymerization temperatures between −50° C. and 150° C. can be used, however, more preferred temperatures are between −20° C. and 100° C, most preferred between 0° C. and 70° C. For pure monomer, the temperature is preferably between −50° C. and 100° C., more preferably between −20° C. and 75° C., and most preferably between −10° C. and 60° C. For $C_5$ monomers it is between −50° C. and 100° C., more preferably between −20° C. and 75° C., and most preferably between −10° C. and 70° C. For $C_9$ monomers it is preferably between 0° C. and 150° C., more preferably between 10° C. and 120° C., and most preferably between 20° C. and 110° C. Temperature is found to have a significant effect on the properties of the resulting resins. Higher molecular weight and high softening point resins are prepared at lower reaction temperatures.

The polymerization process can be carried out as a continuous, semi-batch, or batch process in such diverse reactors as continuous, batch, semi-batch, fixed bed, fluidised bed, and plug flow. For instance, in continuous processes, a solution of the monomers can be passed over the catalyst in a fixed bed, or the monomers can be co-fed with a catalyst slurry into a continuous reactor. Fixed bed reactions are preferred as they can improve the colour of the resin as colour formers may be removed by the catalyst system as the feed enters the bed, typically at the top of the bed enabling resins of improved colour to be obtained at the end, typically at the bottom of the bed.

The reaction may be stopped by physically separating the catalyst from the products. Physical separation may render the reaction solution neutral. Furthermore, physical separation can be performed by simple filtration or by separation of the resin solutions from a fixed catalyst bed. As a result, acid functionality and catalyst residues are not left in the resin product.

We have found that the catalyst systems used in the present invention are robust and stable. They retain their activity over prolonged periods of time, which indicates that they would have viable commercial utility.

After the resin is produced, it may be subsequently subjected to hydrogenation to reduce coloration and improve colour stability.

Any of the known processes for catalytically hydrogenating hydrocarbon resins can be used to hydrogenate the resins of this invention; in particular the processes of U.S. Pat. No. 5,171,793, U.S. Pat. No. 4,629,766, U.S. Pat. No. 5,502,104 and U.S. Pat. No. 4,328,090 and WO 95/12623 are suitable. Generic hydrogenation treating conditions include reactions in the temperature range of about 100° C.–350° C. and pressures of between five atmospheres (506 kPa) and 300 atm. (30390 kPa) hydrogen, for example, 10 to 275 atm. (1013 kPa to 27579 kPa). In one embodiment the temperature is in the range including 180° C. and 320° C. and the pressure is in the range including 15195 kPa and 20260 kPa hydrogen. The hydrogen to feed volume ratio to the reactor under standard conditions (25° C., 1 atm (101 kPa) pressure) typically can range from 20–200, for water-white resins 100–200 is preferred.

Another suitable process for hydrogenating the resin of this invention is that described in EP 0082 726. EP 0082 726 describes a process for the catalytic or thermal hydrogenation of petroleum resins using nickel-tungsten catalyst on a gamma-alumina support wherein the hydrogen pressure is $1.47 \times 10^7$–$1.96 \times 10^7$ Pa and the temperature is in the range of 250–330° C. Thermal hydrogenation is usually performed at 160° C. to 320° C., at a pressure of $9.8 \times 10^5$ to $11.7 \times 10^5$ Pa and for a period typically of 1.5 to 4 hours. After hydrogenation the reactor mixture may be flashed and further separated to recover the hydrogenated resin. Steam distillation may be used to eliminate oligomers, preferably without exceeding 325° C. resin temperature.

In a preferred embodiment, the hydrogenation is carried out by contacting the resin in the presence of hydrogen and a hydrogenation catalyst which is typically metal compounds supported on porous refractory substrate particles having:

a) mean maximum diffusion path length less than or equal to twice the hydraulic radius b) a pore volume distribution wherein;
  i) pores having diameters >150,000 Å constitute greater than about 2% of the total volume
  ii) pores having diameters >20,000 Å and <150,000 Å constitute greater than about 1% of the total volume, and
  iii) pores having diameters >2,000 Å and <20,000 Å constitute greater than about 12% of the total volume, and, c) a total pore volume of from 45% to 86% of the total volume of the substrate particles.

In a particularly preferred embodiment, the catalyst comprises nickel and/or cobalt on one or more of molybdenum, tungsten, alumina or silica supports. In a preferred embodiment, the amount of nickel oxide and/or cobalt oxide on the support ranges from 2 to 10 wt %. The amount of tungsten or molybdenum oxide on the support after preparation ranges from 5 to 25 wt %. Preferably, the catalyst contains 4 to 7 wt % nickel oxide and 18 to 22 wt % tungsten oxide. This process and suitable catalysts are described in greater detail in WO 98/22214.

In another preferred embodiment, the hydrogenation may be carried out using the process and catalysts described in U.S. Pat. No. 4,629,766. In particular, nickel-tungsten catalysts on gamma-alumina are preferred.

The resins of this invention may be combined with a base polymer to form an adhesive. Typical base polymers include homopolyethylene, ethylene copolymerized with up to 50 wt % of one or more $C_3$ to $C_{20}$ α-olefins, polypropylene, propylene copolymerized with up to 50 wt % of one or more of ethylene and/or $C_4$ to $C_{20}$ α-olefins, polybutene, ethylene vinyl acetate copolymers, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), EMA, copolymers of acrylic acid, polymethylmethacrylate or any other polymers polymerizable by a high-pressure free radical process, PVC, polybutene-1, isotactic polybutene, elastomers such as ethylene-propylene rubber (EPR), vulcanised EPR, EPDM, block copolymer elastomers such as SBS (Styrene-Butadiene-Styrene), SIS (Styrene-Isoprene-Styrene), nylons, polycarbonates, PET resins, crosslinked polyethylene, copolymers of ethylene and vinyl alcohol (EVOH), polymers of aromatic monomers such as polystyrene, copolymers of isobutylene and para-alkyl styrene, poly-1 esters, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene (PIB) or blends thereof.

In a preferred embodiment, the base polymer is selected from the group consisting of block copolymers of styrene and isoprene or butadiene, polyisoprene, butyl rubber, ethylene vinyl acetate, ethylene methyl acrylate, amorphous polypropylene, ethylene propylene diene monomer rubber, copolymers of ethylene and a $C_3$ to $C_{20}$ α-olefin, copolymers of propylene and ethylene or a $C_4$ to $C_{20}$ α-olefin, metallocene polyethylenes, metallocene polypropylenes, natural rubber, styrene butadiene rubber, copolymers of isobutylene and para-alkyl styrene. Particularly, preferred polymers are styrene-butadiene-styrene block copolymers, butyl rubber, natural rubber and styrene-butadiene rubber.

In a particular preferred embodiment, the base polymer is a SIS (Styrene-Isoprene-Styrene) block copolymer. In another particularly preferred embodiment the SIS block copolymer has 10 wt % or less diblock present, preferably 5 wt % or less. A preferred base polymer is styrene-isoprene-styrene block copolymer as commercially available from DEXCO POLYMERS under the trade name VECTOR®.

In another preferred embodiment, the base polymer is a polymer produced using a metallocene catalyst system. Typically, the metallocene homopolymers or copolymers are produced using mono- or bis-cyclopentadienyl transition metal catalysts in combination with an activator of alumoxane and/or a non-coordinating anion in solution, slurry, high pressure or gas phase. The catalyst system may be supported or unsupported and the cyclopentadienyl rings may be substituted or unsubstituted. Titanium, zirconium and hafnium are preferred transition metals. Several commercial products produced with such catalyst/activator combinations are commercially available from Exxon Chemical Company in Baytown, Tex. under the tradenames EXCEED™ and EXACT™ and polymers available for Dow Chemical Company under the tradename ACHIEVE™. For more information on the methods and catalysts/activators to produce such metallocene homopolymers and copolymers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO 91/09882; WO 94/03506 and U.S. Pat. No. 5,055,438.

The metallocene produced copolymers described above preferably have a composition distribution breadth index (CDBI) of 50% or more, preferably above 60%, even more preferably above 70%. In one embodiment, the CDBI is above 80%, even more preferably above 90%, even more preferably above 95%. In another particularly preferred embodiment, the copolymer is polyethylene and has a CDBI between 60 and 85%, even more preferably between 65 and 85%.

Composition Distribution Breadth Index (CDBI) is a measure of the composition distribution of monomer within the polymer chains and is measured by the procedure described in PCT publication WO 93/03093, published February 18, 1993. Fractions having a weight average molecular weight (Mw) below 15,000 are ignored when determining CDBI.

The resin may be present in the blend from 1 to 200 parts per 100 parts of base polymer in the adhesive formulation. In a preferred embodiment, the resin is present in the blend from 25 parts to 200 parts per 100 parts of polymer. In another embodiment, the preferred range is 80 to 120 parts resin per 100 parts polymer.

The adhesive formulations may also contain additives well known in the art such as anti-block, anti-static, antioxidants, UV stabilisers, neutralisers, lubricants, surfactants and/or nucleating agents. Preferred additives include silicon dioxide, titanium dioxide, polydimethylsiloxane, talc, dyes, wax, calcium stearate, carbon black and glass beads.

The resins may be formed into pressure sensitive adhesives, hot melt adhesives or contact adhesives and used in applications such as tapes, labels, paper impregnation, hot melt adhesives including woodworking, packaging, bookbinding or disposables, sealants, rubber compounds, pipe wrapping, carpet backing, contact adhesives, road-marking or tire construction and polymer additives.

In a particularly preferred embodiment, the resins are formulated into a pressure sensitive adhesive application. Such a pressure sensitive adhesive composition may be applied to any conventional backing layer such as paper, foil, polymeric foil, release liners, woven or non-woven backing material to make for example, packaging tapes.

The resins of the current invention can also be used as modifiers in adhesives, sealants, printing inks, protective coatings, plastics, polymer films, construction applications such as road markings, flooring, paper additives and as dry cleaning re-texturising agents.

A particularly important use of these petroleum resins is as tackifiers in adhesive systems such as solvent based adhesives, hot melt adhesives and pressure sensitive adhesives. In such adhesive systems the petroleum resin acts as a tackifier for other polymers and rubbers used in the adhesive system. The choice of the polymer and/or the rubber depending on the nature of the adhesive and its particular application. For example hot melt adhesives frequently are based on ethylene containing copolymers, particularly ethylene/vinyl acetate copolymers. Pressure sensitive adhesives frequently are based on natural or synthetic rubbers such as styrene copolymer rubbers, solvent based adhesives may be aqueous emulsions or organic solvent based, although for environmental reasons aqueous systems are preferred. Examples of polymer systems useful in such aqueous adhesive systems are polyacrylate and polymethacrylate emulsions.

Because the acid sites are an integral part of the catalyst, contamination of the resin products or solvents with catalyst residues is minimal. As a result, the catalysts do not impart undesirable colour to the hydrocarbon resins. If pure styrene-based monomers are used, the resulting resins can be water white. Furthermore the resins are substantially free of fluoride impurities.

The catalysts used in the present invention are robust, are predicted to have long life and can generally be regenerated and recycled to thereby minimise waste disposal of spent catalyst. In contrast, the unsupported Lewis acids are generally single use catalysts.

Further, the catalysts of the present invention are non-hazardous when compared with traditional unsupported Lewis acid catalysts such as $BF_3$ and $AICl_3$. The catalysts of the present invention generally do not generate corrosive or hazardous liquid or gaseous acids on exposure to moisture.

The present invention is illustrated by reference to the following examples:

EXAMPLE 1

The following feed compositions were used in this Example:

Feed A

Aliphatic $C_5$ to $C_6$ feed containing:

8.4% saturated hydrocarbons 40.8% olefins
49.0% diolefins
Feed B
Aliphatic $C_5$ to $C_6$ feed containing:
32.6% saturates
63.0% olefins
3.7% diolefins
Feed C
Aromatic $C_8$ to $C_9$ feed containing:
33.2% non polymerizables
45.57% polymerizables
17.88% partly polymerizables
Any balance of feeds being unidentified materials.
The catalyst used was prepared as follows:

10 gms of mesoporous $SiO_2$ (K 100-Merck) of surface area 310 $m^2$ $g^{-1}$ was dried for 24 hours at 300° C., then stirred under a $N_2$ atmosphere with a mixture of 4.2 gms $BF_3(H_2O)_2$ (Aldrich 96%) diluted in 100 ml of ethanol as cocatalyst at 20° C. The catalyst slurry was stirred for 2 hours, then dried slowly on a rotary evaporator at 50° C. to remove excess ethanol, about 50 ml.

Polymerization was then performed in a 2 liter Kimble flask fitted with a 500 ml dropping funnel, a catalyst dropping funnel, a condenser, thermocouple, overhead stirrer and a nitrogen supply to provide an inert blanket.

35ml of anhydrous toluene were placed in the reactor together with 14 grams of the catalyst prepared as described above. The reactor was stirred at 600 rpm and 900 ml of a feed comprising:

28% Feed A
16% Feed B
36% Feed C mixed with 20% by weight of a saturated $C_5/C_6$ stream were fed over a period of 1.5 hours. The feed had been previously dried over a molecular sieve which itself had been dried at 300° C. for 24 hours in the presence of 40 grams of a 4 Angstrom molecular sieve absorbent.

The reaction which was exothermic was performed at ambient temperature.

After 1.5 hours the reaction was terminated by filtering and then quenching with the addition of 120 ml Corexit 8380 followed by 60 ml ammonia.

The resin was then obtained by stripping.

The resin had an Mn of 580, Mw 1380, Mz 7400 and a softening point of 81° C.

Pressure sensitive adhesive formulations were prepared by blending 90 parts by weight of the resin with 100 parts of a solution of 10% Ivory Coast Natural Rubber of Mooney 50 in 90 parts DSP, 9 parts toluene and 1 part methanol.

The pressure sensitive adhesive properties are given in the following table in which The coating weight was 20 to 22 grams per square meter.
The 1800 peel adhesion on steel was measured by the AFERA Test Method 4001.
The loop tack on steel was measured by the FINAT Test Method 9.
The ball tack was measured by PSTC 6.
The shear on steel was measured and on cardboard by PSTC 7.

The yield of the resin of the invention was 16% whereas that obtained using a supported $AlCl_3$ catalysed resin from the same feed was 5%. The resin of the invention contained 42.8% aromatics compared to 31.5% for the $AlCl_3$ resin, the resin of the invention had a softening point of 81° C. compared to 77° C. for the $AlCl_3$ resin and an Mn of 580 compared to 820. The adhesive properties of the resin of the invention were compared with similar adhesives but containing the resins obtained from the same feed and with a supported $AlCl_3$ catalyst.

Pressure Sensitive Adhesive

| Resin | Example of invention | Supported $AlCl_3$ Catalysed Resins |
|---|---|---|
| 180° peel adhesion (N/cm) (steel) | 1,92 | 2,08 |
| Loop tack @ RT (N/25 mm) (steel) | 5,8 | 6,2 |
| Ball tack (cm) | 4,5 | 2,0 |
| Shear on steel @ RT | >100 | 17,8 cf |
|  | >100 | 21,8 cf |
| 12.5 mm*25 mm - 1 kg (hrs) | >100 | 23,9 cf |
| Shear on cardboard @ RT | 35,52 cf | 9,03 cf |
|  | 32,72 cf | 10,46 cf |
| 12.5 mm*25 mm - 1 kg (hrs) (Bookbinders Cardboard) | 39,18 cf 50,03 cf | 7,91 cf | cf means cohesive failure

EXAMPLE 2

In this example the catalyst was prepared as follows:

4.2 gms of $BF_3(H_2O)_2$ was added to 100ml absolute ethanol cocatalyst and 10 g of $SiO_2$ (K100, 300 $m^2/g$ dried for 24 hrs at 300° C.) was added. The slurry was stirred for 2 hours at 20° C. and then transferred to a rotary evaporator where the excess ethanol was evaporated at 50° C. until the catalyst was completely dry.

Various polymerizations were performed according to the following procedure. The reactor was purged with a $N_2$ flow of 50 ml/min, then 17 ml anhydrous toluene was added along with varying amounts of the 4 mmolg$^{-1}$ $BF_3(H_2O)_2$/ $SiO_2$/EtOH catalyst, prepared as above and stirred to make a slurry. 450 ml of $C_8$ to $C_9$ aromatic feed (pre-treated with 10 g 4 Angstrom molecular sieve for 24 hours) were then added slowly over a period of 90 minutes.

The results obtained using 2.5, 5 and 10 g of catalyst are shown below in Table 2, from which it can be seen that increasing the amount of catalyst from 2.5 to 5 g approximately doubles the yield of resin produced, while maintaining comparable resin properties. However, increasing the amount of catalyst to 10 g results in both much higher exotherm of 28° and yield of resin 28% respectively.

TABLE 2

| Amount of Catalyst gms | Yield (%) | Exotherm | Gardner Color |
|---|---|---|---|
| 2.5 | 2% | 3° | 16 |
| 5.0 | 4.5% | 4° | 13 |
| 10.0 | 28% | 28° | 8 |

EXAMPLE 3

In this example the process of Example 2 was repeated using 5 gms of catalyst. In one experiment the drying of the feed was omitted.

The results were as follows:

| Feed | Yield (%) | Exotherm | Gardner Color |
|---|---|---|---|
| Dried | 4.5% | 4° | 13 |
| Wet | 7.5% | 4° | 9 |

EXAMPLE 4

This example compares the use of supported and unsupported (homogeneous) catalyst, using dried feed and the polymerization conditions of Example 2.

The results were as follows:

| | Yield (%) | Exotherm | Gardner Color | Mn | Mw |
|---|---|---|---|---|---|
| 5 g Catalyst of Invention | 4.5% | 4° | 13 | 510 | 1670 |
| Homogenous 20 mmol $BF_3(H_2O)_2$ | 17% | 30° | 8 | 370 | 760 |

The use of homogeneous $BF_3$ results in a much larger exotherm and higher yield of resin, but the material properties are degraded compared to those obtained with the heterogeneous catalyst.

EXAMPLE 5

The process of Example 1 was repeated except that only feed C was used so the polymerizables in the feed were all aromatics. 100% conversion of unsaturates was achieved.

EXAMPLE 6

The stability of the boron trifluoride/ethanol complex catalyst supported on silica was evaluated by conducting ten sequential polymerizations in each of which in polymerization catalyst and the total aromatic feed used in Example 5 were added to the reactor.

Once the temperature of the reactor stabilised in each polymerization the next portion of feed and catalyst were added.

At the eight in the sequence no catalyst was added and in the ninth no feed was added.

The results are given in the following table:

| Run | $M_{SiO2}$, g | Volume of C9 feed | t, min | ΔT |
|---|---|---|---|---|
| 1 | 0.344 | 15 | 20 | 4.4 |
| 2 | 0.336 | 15 | 20 | 5.4 |
| 3 | 0.335 | 15 | 24 | 5.6 |
| 4 | 0.337 | 15 | 20 | 3.4 |
| 5 | 0.326 | 15 | 19 | 4.8 |
| 6 | 0.345 | 15 | 16 | 3.7 |
| 7 | 0.334 | 15 | 13 | 3.2 |
| 8 | — | 15 | 10 | 2.2 |
| 9 | 0.338 | — | 15 | — |
| 10 | 0.344 | 15 | 11 | 1.7 |

ΔT indicating that reaction was taking place, activity at polymerization and showing that the catalyst is robust and stable. The reaction during Run 8 with addition of feed with no catalyst confirms the catalyst stability under reaction conditions. Addition of catalyst with no feed in Run 9 confirms that all the polymerizable components had reacted in Run 8.

We claim:

1. A petroleum resin prepared by the polymerization of $C_4$ to $C_6$ and/or $C_8$ to $C_9$ unsaturated hydrocarbon feeds wherein the feeds are contacted under polymerization conditions with a catalyst comprising a supported boron trifluoride/cocatalyst complex wherein said feeds comprise one or more of, an aromatic petroleum feed comprising $C_8$ to $C_9$ polymerizable and unpolymerizable materials; alohamethyl styrene, vinyl toluene, indene, alkylated derivatives thereof or mixtures thereof; butadiene isobutylene. 2-methyl-2-butene, 1-pentene, 2-methyl-1-pentene, cyclopentene, cyclohexene, 1,3-pentadiene, 1,4-pentadiene, isoprene, 1,3-hexadiene, 1,4-hexadiene, cyclopentadiene or dicyclopentadiene.

2. The resin of claim 1, in which the boron trifluoride/cocatalyst complex is of the formula $BF_3HX$ where NIX is the complexing agent.

3. The resin of claim 1 in which HX has a pKa between 2.0 and 4.5.

4. The resin of claim 1 in which the catalyst exhibits both Lewis and Bronsted acidity.

5. A resin of claim 1 in which the cocatalyst is organic.

6. The resin of claim 5 in which the cocatalyst is an alcohol.

7. The resin of claim 6 in which the alcohol is of the formula RON where R is methyl, ethyl, propyl or butyl.

8. The resin of claim 1 in which the cocatalyst is a carboxylic acid.

9. The resin according to claim 8 which the Mid is acetic acid.

10. The resin of claim 1 in which prior to reaction with the boron trifluoride/cocatalyst complex the support contains surface hydroxyl or oxy groups.

11. The resin of claim 1, in which the support is silica.

12. The resin of claim 1, in which the feed is an aromatic petroleum feed comprising $C_8$ to $C_9$ polymerizable and unpolymerizable materials.

13. The resin of claim 1 in which the feed is a mixture of a $C_5$ to $C_6$ feed and a $C_8$ to $C_9$ feed.

14. The resin of claim 1–13 wherein the catalyst is reused.

15. A petroleum resin according to claims 1–13 further comprising the step of hydrogenating the resin.

16. The petroleum resin of claim 1 wherein said feeds further comprise up to 40 wt. % of a chain transfer agent, said chain transfer agent selected from one of isobutylene, 2-methyl-1-butene, 2-methyl-2-butene, dimers thereof or trimers thereof.

17. The petroleum resin of claim 1 wherein said alkylated derivatives of alpha-methyl styrene, vinyl toluene, or indene, comprise t-butyl styrene or phenyl styrene.

18. The petroleum resin of claim wherein said feeds comprise styrene, alpha-methyl styrene, beta-methyl styrene, 4-methyl styrene, or vinyl toluene.

* * * * *